(12) United States Patent
Oki et al.

(10) Patent No.: US 9,162,318 B2
(45) Date of Patent: Oct. 20, 2015

(54) FRICTION STIR PROCESSING APPARATUS AND FRICTION STIR PROCESSING METHOD

(75) Inventors: Sachio Oki, Osaka (JP); Kiichi Kakei, Osaka (JP); Tomotake Hirata, Osaka (JP); Takayuki Takasugi, Osaka (JP); Yasuyuki Kaneno, Osaka (JP); Noboru Mochizuki, Osaka (JP); Takanori Uchida, Osaka (JP)

(73) Assignee: ISEL CO., LTD, Osaka (JP)

( * ) Notice: Subject to any disclaimer, the term of this patent is extended or adjusted under 35 U.S.C. 154(b) by 0 days.

(21) Appl. No.: 14/006,192

(22) PCT Filed: Mar. 27, 2012

(86) PCT No.: PCT/JP2012/057939
§ 371 (c)(1),
(2), (4) Date: Oct. 17, 2013

(87) PCT Pub. No.: WO2012/133411
PCT Pub. Date: Oct. 4, 2012

(65) Prior Publication Data
US 2014/0034709 A1 Feb. 6, 2014

(30) Foreign Application Priority Data
Mar. 29, 2011 (JP) ................................. 2011-072458

(51) Int. Cl.
*B23K 20/12* (2006.01)
*B23K 11/31* (2006.01)

(52) U.S. Cl.
CPC ............. *B23K 20/126* (2013.01); *B23K 11/317* (2013.01); *B23K 11/318* (2013.01); *B23K20/123* (2013.01); *B23K 20/125* (2013.01); *B23K 20/1245* (2013.01); *B23K 20/1265* (2013.01)

(58) Field of Classification Search
CPC ............. B23K 20/1245; B23K 20/123; B23K 20/126; B23K 20/1265; B23K 2201/16; B23K 2203/10; B23K 11/317; B23K 11/318; B23K 20/125; B23K 20/1255; F15B 11/048; F15B 2211/3052; F15B 2211/30525

USPC ................................. 228/112.1, 2.1, 113, 114
See application file for complete search history.

(56) References Cited

U.S. PATENT DOCUMENTS

| 5,450,756 A * | 9/1995 | Kirii et al. ........................ 73/825 |
| 6,302,315 B1 * | 10/2001 | Thompson ................. 228/112.1 |
| 2010/0163604 A1 * | 7/2010 | Noe et al. ....................... 228/114 |

FOREIGN PATENT DOCUMENTS

| JP | 2002-103061 | 4/2002 |
| JP | 2002-153978 | 5/2002 |

OTHER PUBLICATIONS

International Preliminary Report on Patentability for International Patent Application PCT/JP2012/057939 mailed on Oct. 3, 2013.
International Search Report for International Patent Application PCT/JP2012/057939 Mailed on Jun. 26, 2012.
Written Opinion for International Patent Application PCT/JP2012/057939 Mailed on Jun. 26, 2012.

\* cited by examiner

*Primary Examiner* — Erin Saad
(74) *Attorney, Agent, or Firm* — Amin, Turocy & Watson, LLP

(57) ABSTRACT

A friction stir processing apparatus comprises a tool, a processing head retaining the tool, a support table retaining the workpiece, and a cylinder unit biasing the support table toward the tool. The tool having a probe projecting from a shoulder surface, for performing friction stir processing on a workpiece made of a metal material. The processing head is pressing the tool against the workpiece so as to relatively shift the tool in a processing direction. The friction stir processing apparatus comprises load control means for controlling to constantly keep the bias force of the cylinder unit so as to constantly keep pressurizing force of the tool pressing the workpiece. It is thus possible to perform friction stir processing with excellent quality even when the workpiece has a different thickness or is made of a different material.

1 Claim, 9 Drawing Sheets

1: Friction stir welding apparatus
2: Processing mechanism
3: Support table
6: Pneumatic cylinder
7: Processing head
10: Main frame
11: Linear motion mechanism
12: Guide rail
13: Ball screw
14: Slider 20: Tool
31: Jig
32: Backing member
33: Work presser foot
71: Tool holder
81: Rotating motor
82: Elevating motor
83: Transferring motor
L: Joining line
W1, W2: Work

FIG. 6 Example

FIG. 7 Comparative example

FRICTION STIR PROCESSING APPARATUS AND FRICTION STIR PROCESSING METHOD

TECHNICAL FIELD

The present invention relates to a friction stir processing apparatus and a friction stir processing method for pressing a rotating tool against a workpiece made of a metal material and generating frictional heat to perform friction stir processing.

BACKGROUND ART

There has been known friction stir welding (FSW) as the technique of welding workpieces by rotating and pressing a cylindrical tool (having a probe projecting from the center of the distal end of a shoulder portion) to a joining line along which the workpieces each made of a metal material are butted against each other and relatively shifting the tool along the joining line so as to soften the workpieces with use of generated frictional heat. Furthermore, friction stir processing (FSP) of improving strength and hardness of the surface of a workpiece, and friction spot joining (FSJ) of performing spot joining of workpieces are also performed with use of the tool. The FSW, the FSP, and the FSJ are collectively referred to as friction stir processing.

In order to finish a processed portion of a workpiece with excellent quality in friction stir processing, it is necessary to keep, within an appropriate range, height relationship between the tool and the workpiece, in particular, a gap S1 between the distal end of the probe of the tool and the rear surface of the workpiece and a buried amount S2 of the shoulder portion of the tool into the workpiece (see FIG. 5).

There is a conventional friction stir welding apparatus for performing load control on a tool so as to substantially constantly keep pressurizing force of the tool to a workpiece (Patent Document 1). More specifically, as shown in FIG. 8, in the conventional friction stir welding apparatus, an air cylinder 640 biases downward a processing head 620 retaining a tool 610 so as to press the tool 610 against a workpiece 660 and bring the tool 610 into contact with the workpiece 660. A pressure reducing valve 650 of constant secondary pressure controls to substantially constantly keep bias force of the tool 610 generated by the air cylinder 640 to the workpiece 660. In the conventional friction stir welding apparatus, the bias force of the air cylinder 640 is kept substantially constantly to substantially constantly keep the pressurizing force of the tool 610 to the workpiece 660. It is possible to substantially constantly keep the height relationship between the tool 610 and the workpiece 660 even when there is variation in thickness of the workpiece 660 due to a production error, an error in setting on a surface plate 670, local deformation of the surface of the surface plate 670, or the like. It is accordingly possible to achieve excellent welding quality of the workpiece 660.

RELATED ART DOCUMENT

Patent Document

Patent Document 1: JP 3261431 B1

SUMMARY OF THE INVENTION

Problems to be Solved by the Invention

In the conventional friction stir welding apparatus, the processing head 620 retaining the tool 610 is supported so as to be shiftable upward and downward by a frame with a slide mechanism being interposed therebetween (paragraphs 0010 and the like in Patent Document 1). The processing head 620 is provided with a heavy motor 630 for, driving to rotate the tool 610. When the air cylinder 640 applies bias force to the tool 610 during friction stir welding, the workpiece 660 receives the bias force of the air cylinder 640 and the weight of the processing head 620 as pressurizing force of the tool 610 to the workpiece 660. In this case, own weight of the processing head 620 determines the minimum value of the pressurizing force applied to the workpiece 660. It is thus difficult to perform friction stir processing on the workpiece 660 with pressurizing force smaller than the weight of the processing head 620. The conventional friction stir welding apparatus had difficulty in keeping the height relationship between the tool 610 and the workpiece 660 within an appropriate range due to large pressurizing force of the tool 610 in a case where the workpiece 660 is thin, for example. In load control by means of the tool in the conventional friction stir welding apparatus, there is a limit of reducing pressurizing force of the tool 610 because the weight of the processing head 620 is applied to the workpiece 660. It is thus necessary to prepare a dedicated apparatus in order to perform friction stir processing with small pressurizing force of the tool 610 on the thin workpiece 660 exemplified above or a soft workpiece 660. Workpieces of wide variation in thickness and material cannot be processed by a single apparatus, which is problematic in terms of flexibility of the apparatus.

The present invention has been achieved in view of the above circumstances, and it is an object of the present invention to provide a friction stir processing apparatus and a friction stir processing method that enable friction stir processing with excellent quality with use of a single apparatus, regardless of thickness, material, and the like of a workpiece no matter how the workpiece is thin, thick, soft, or hard.

Solutions to the Problems

A friction stir processing apparatus according to the present invention includes:

a tool having a probe projecting from a shoulder surface, for performing friction stir processing on a workpiece made of a metal material;

a processing head retaining the tool and rotating and pressing the tool against the workpiece so as to relatively shift the tool in a processing direction; and a support table retaining the workpiece;

the friction stir processing apparatus further including:

a cylinder unit supporting the support table and biasing the support table toward the tool; and load control means for controlling to constantly keep the bias force of the cylinder unit so as to constantly keep pressurizing force of the tool pressing the workpiece.

In the configuration described above, in a state where the tool does not press the workpiece (including a state where the tool is in contact with the workpiece), the cylinder unit supporting the support table receives force of supporting the support table, more particularly, the weight of the support table (including the weight of components attached to the support table) and the weight of the workpiece supported by the support table. However, the cylinder unit does not receive the weight of the processing head of the tool. In a state where the tool is in contact with the workpiece so as to press the workpiece, the bias force of the cylinder unit includes, in addition to the bias force (minimum bias force) equivalent to the weight of the support table and the weight of the workpiece, further pressurizing bias force (additional bias force)

corresponding to the pressurizing force of the tool to the workpiece. In other words, if the bias force of the cylinder unit is kept so as to be equal to the minimum bias force during friction stir welding, the tool has pressurizing force to the workpiece set to zero, and the additional bias force of further pressurizing the cylinder unit serves as pressurizing force of the tool to the workpiece. It is thus possible to control the pressurizing force of the tool to the workpiece so as to have zero as the minimum value by setting the bias force (additional bias force) of the cylinder unit to a predetermined value with use of the load control means. The pressurizing force of the tool to the workpiece can be set in a wide range from a small value to a large value. For example, it goes without saying that friction stir welding can be certainly performed with pressurizing force of the tool being kept large in a case where the workpiece is thick, hard, or the like. In a case where the workpiece is thin, soft, or the like, friction stir welding can be performed while performing load control so as to keep small pressurizing force of the tool.

It is possible to set and constantly keep appropriate pressurizing force of the tool to the workpiece and keep the tool and the workpiece so as to have height relationship in the appropriate range, in accordance with the thickness, the material, and the like of the workpiece, no matter how the workpiece is thin, thick, soft, or hard.

The friction stir processing apparatus desirably includes tool height setting means for locating the tool at preliminarily set height with respect to the workpiece.

It is thus possible to control the tool height during friction stir processing so that the tool and the workpiece have height relationship set in the appropriate range with use of the tool height setting means when the tool is initially made in contact with the workpiece. In the state where the tool and the workpiece are controlled to have height relationship in the appropriate range, load control is performed so that the cylinder unit biases the support table toward the tool with constant bias force. It is thus possible to constantly keep the state during friction stir welding.

The cylinder unit is desirably located so as to be balanced in the processing direction of the workpiece on the support table.

The cylinder unit is located so as to be balanced in the processing direction. The pressurizing force of the tool to the workpiece is not varied in the processing direction even in a case where the processed distance of the workpiece is long or the processed positions are distant from each other. It is thus possible to keep the tool and the workpiece so as to have height relationship within the appropriate range across the long processed distance of the workpiece even in a case where the processed distance of the work is long. It is also possible to keep the tool and the workpiece so as to have height relationship within the appropriate range at each processed position even in the case where the processed positions are distant from each other.

The present invention provides a friction stir processing method of pressing a rotating tool against a workpiece made of a metal material and processing the workpiece by softening the workpiece with use of generated frictional heat, the method including upon friction stir processing, initially locating the tool at preliminarily set height with respect to the workpiece, then controlling to constantly keep bias force of a cylinder unit for supporting a support table retaining the workpiece and biasing the support table toward the tool, so as to constantly keep pressurizing force of the tool pressing the workpiece.

This friction stir processing method exerts effects similar to those of the friction stir processing apparatus.

Effects of the Invention

According to the present invention, it is possible to control so as to constantly keep pressurizing force of the tool to the workpiece set not only to a relatively large value or but to an extremely small value. The pressurizing force of the tool to the workpiece can be set appropriately and kept constantly in accordance with the thickness, the material, and the like of the workpiece, so that the tool and the workpiece can have height relationship kept in the appropriate range. It is thus possible to perform friction stir processing with excellent quality even when the workpiece has a different thickness or is made of a different material.

BRIEF DESCRIPTION OF THE DRAWINGS

FIG. 4A is a perspective view of the tool and FIG. 4B is a side view of the tool.

EMBODIMENT OF THE INVENTION

Described below is a friction stir processing apparatus according to an embodiment by exemplifying a friction stir welding apparatus for performing friction stir welding on plate materials (hereinafter referred to as "works" where appropriate) serving as workpieces made of a metal material.

Figure 1:
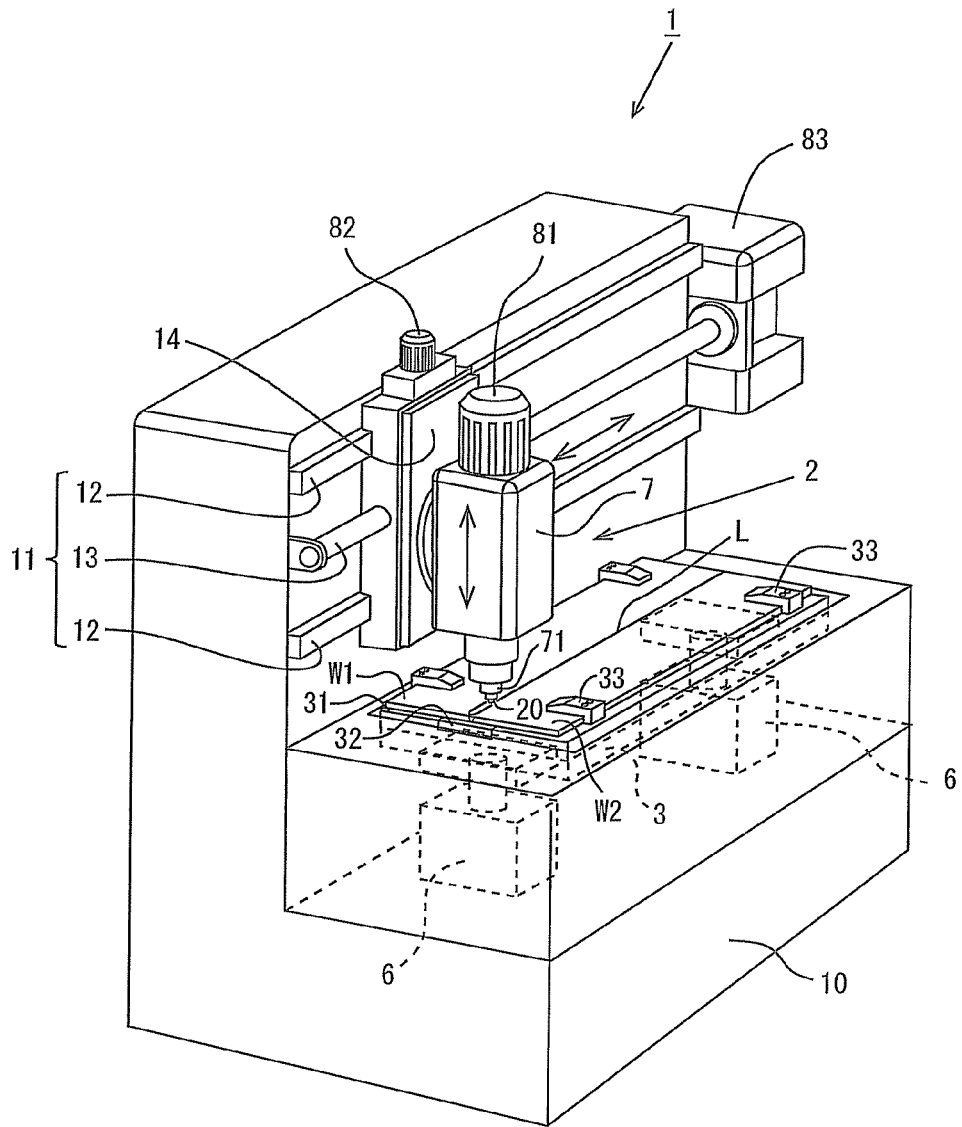
FIG. 1 is a perspective view showing an entire configuration of a friction stir welding apparatus according to an embodiment.
Figure 2:
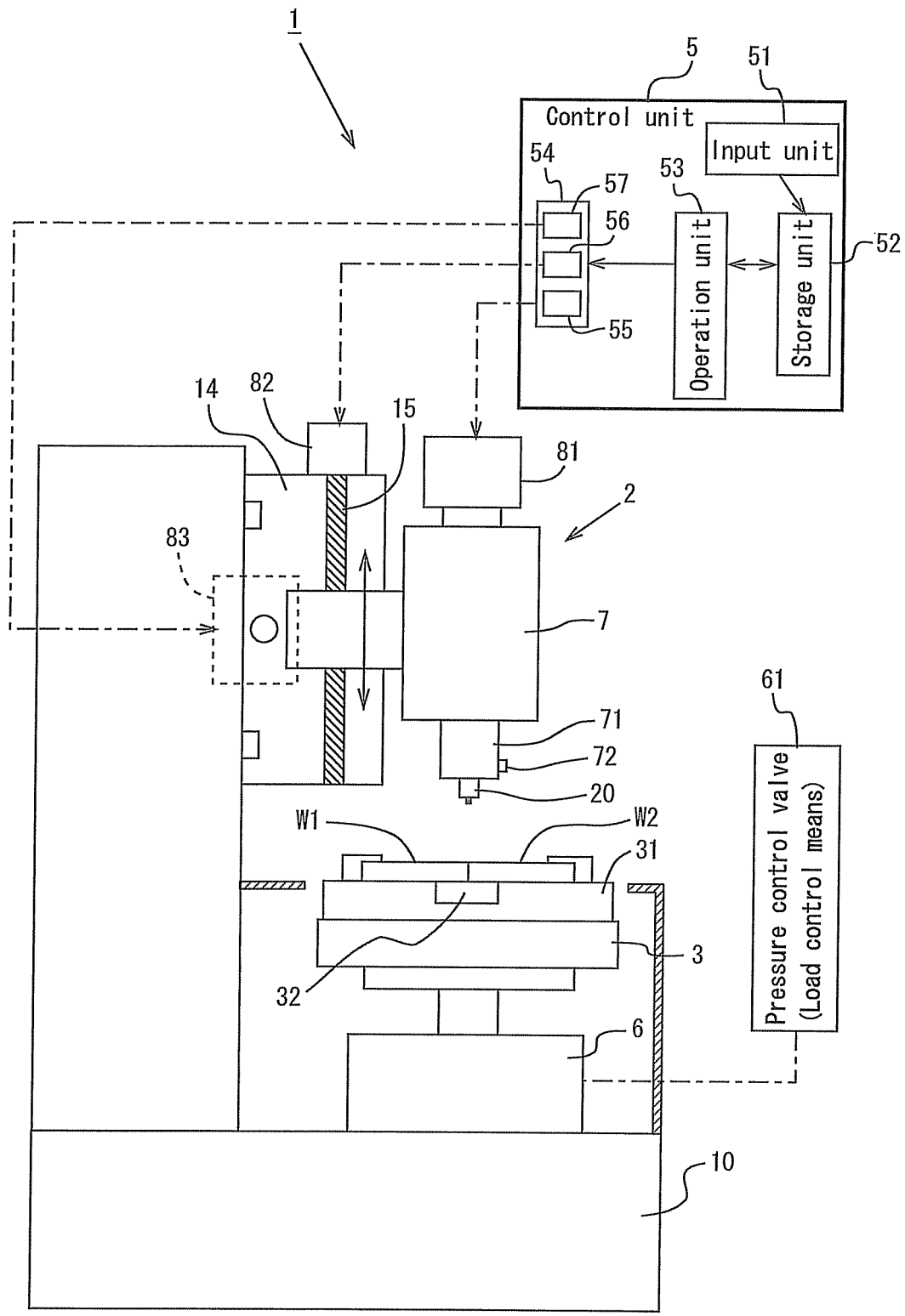
FIG. 2 is a schematic view also showing a block configuration of a control unit in the friction stir welding apparatus according to the embodiment.
Figure 3:
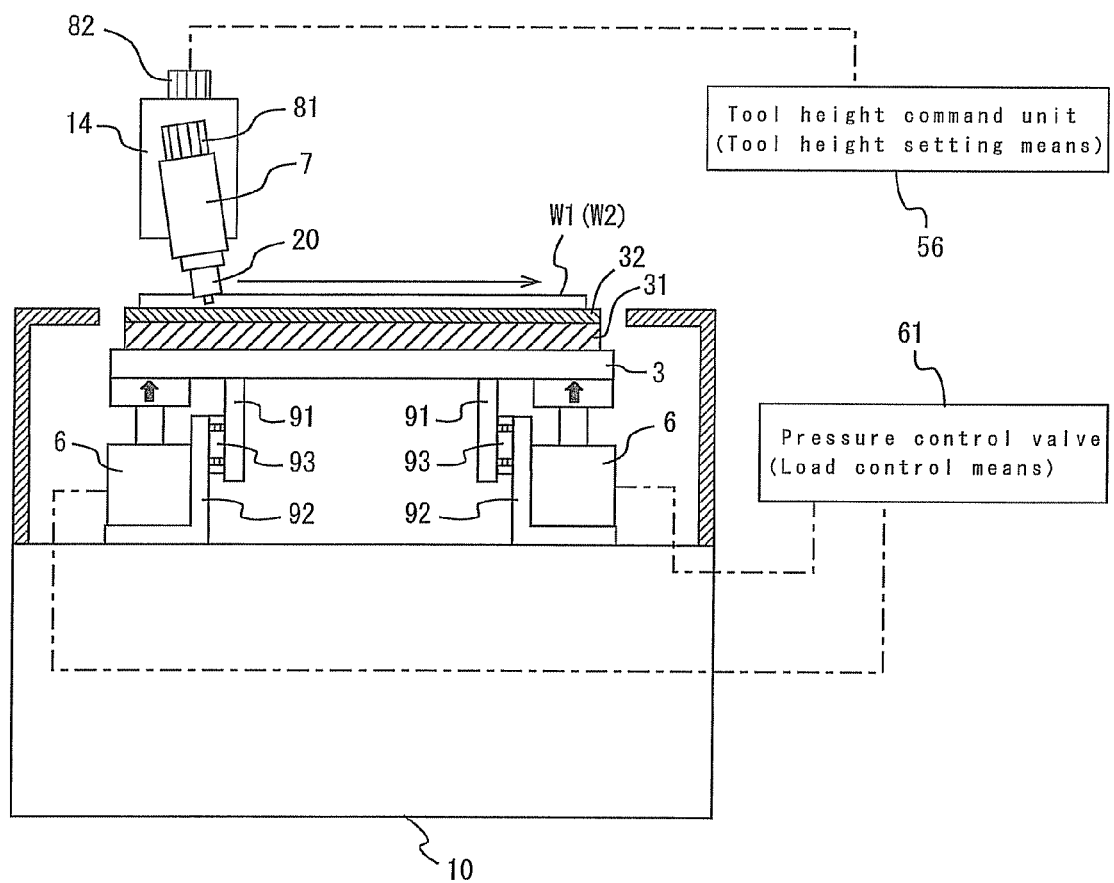
FIG. 3 is a pattern view showing a principal part of the friction stir welding apparatus according to the embodiment.

With reference to FIGS. 1 to 3, a friction stir welding apparatus 1 includes a processing mechanism 2 to which a friction stir processing tool 20 is attached, a support table 3 retaining works W1 and W2, a control unit 5 for controlling behavior of the processing mechanism 2, and a pneumatic cylinder (cylinder unit) 6 attached to a lower surface of the support table 3.

The processing mechanism 2 performs friction stir welding on the works W1 and W2 located on the support table 3 that is shiftable upward and downward. More specifically, the tool 20 of the processing mechanism 2 is rotated and pressed to a joining line L along which the works W1 and W2 on the support table 3 butt against each other and is relatively shifted with respect to the joining line L, so that the butted portion between the works W1 and W2 are softened and welded by frictional heat generated. The support table 3 can be configured to be shiftable forward, backward, rightward, and leftward.

There is provided on the support table 3 a jig 31 used for locating the two works W1 and W2 each in a tabular shape. Attached to the jig 31 is a backing member 32 that is located on rear surfaces of the works W1 and W2. The works W1 and W2 are fixed such that the joining line L along which end surfaces are butted against each other by a work presser foot 33 provided to the jig 31 is located at the center of the backing member 32. A ferrous alloy can be selected as a material for the backing member 32 when each of the works W1 and W2 is a plate material made of an aluminum alloy. When each of the works W1 and W2 is a plate material made of a ferrous alloy, it is possible to select a material that has thermal resistance and thermal conductivity low enough to shield heat radiated from the rear surfaces of the plate materials (such as $Si_3N_4$). The backing member 32 can be a tabular member, a rod-like member, or the like.

The processing mechanism 2 includes the friction stir processing tool 20, a processing head 7 retaining the tool 20, a rotating motor 81 for rotating the tool 20, an elevating motor 82 for elevating the processing head 7, and a transferring motor 83 for transferring the processing head 7 in the transverse direction.

The processing head 7 is provided thereon with the rotating motor 81 and therebelow with a tool holder 71 to which the tool 20 is detachably mounted. The tool holder 71 is connected to the rotating motor 81, and the tool 20 is rotated together with the tool holder 71 when the rotating motor 81 is driven. The processing head 7 is attached so as to be elevated upward and downward with respect to a slider 14 provided to a main frame 10 by a ball screw 15 (see FIG. 2). The elevating motor 82 provided at the slider 14 shifts the processing head 7 upward and downward with respect to the support table 3, so as to set tool height of the tool 20 that is in contact with and pressed against the works W1 and W2.

Figure 5:
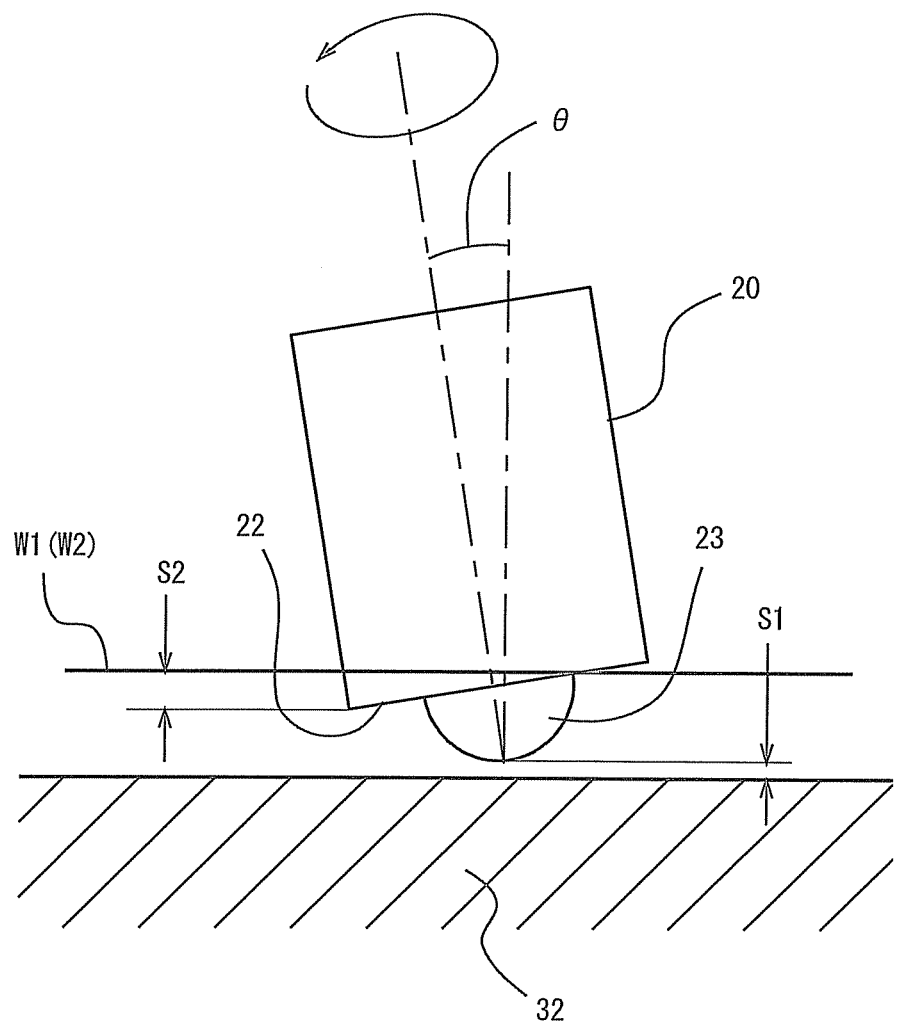
FIG. 5 is a pattern view showing appropriate height relationship between the tool and a work.

The processing head 7 is rotatably attached to the slider 14 so that the tool 20 can be set at a predetermined lead angle θ (a degree of inclination of the distal end of the tool 20 inclined to the transfer direction with respect to a vertical line; see FIG. 5). The slider 14 is attached to a linear motion mechanism 11 that includes a pair of guide rails 12 and a ball screw 13, so as to be shifted parallelly to the support table 3 when the transferring motor 83 is driven. The processing head 7 attached to the slider 14 is accordingly shifted and the tool 20 retained by the processing head 7 is shifted along the joining line L that indicates the processing direction of the works W1 and W2.

Figure 4A:
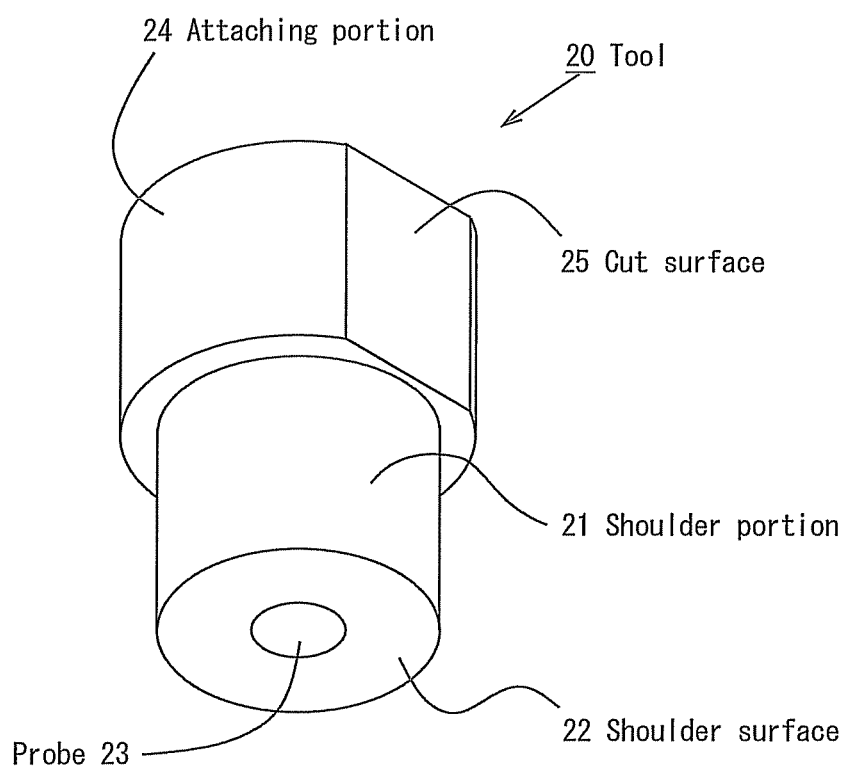
FIGS. 4A and 4B are views each showing a friction stir processing tool.

As shown in FIGS. 4A and 4E, the tool 20 has a cylindrical shoulder portion 21 and a cylindrical attaching portion 24 that is larger in diameter than the shoulder portion 21 and is provided on a side surface with a cut surface 25. The attaching portion 24 of the tool 20 is mounted to the tool holder 71 and a bolt 72 (see FIG. 2) is fastened so as to be in contact with the cut surface 25 of the attaching portion 24, so that the tool 20 is detachably mounted to the tool holder 71. The shoulder portion 21 has a distal end surface that includes a flat shoulder surface 22 and a probe 23 that has a spherical surface shape and projects from the center of the shoulder surface 22. When performing friction stir processing on the works W1 and W2, the tool 20 is rotated and the shoulder surface 22 and the probe 23 are pressed against the works W1 and W2 so as to generate frictional heat. The shape of the tool 20 is not limited to that illustrated in FIGS. 4A and 4B. There can be provided a flange between the shoulder portion 21 and the attaching portion 24, or the attaching portion 24 can have a polygonal shape. The shoulder surface 22 is not necessarily flat but can be curved so as to be slightly convex or slightly concave around the probe 23. The probe 23 does not necessarily have the spherical surface shape but can have a cylindrical shape, a circular truncated cone shape, or the like, or can be formed by cutting a screw.

The tool 20 can be made of any material such as tool steel, cemented carbide, or ceramics. When the works W1 and W2 are each made of a ferrous material such as SUS430 having a high melting point, the tool 20 is preferably made of Ni-based dual multi-phase intermetallic compound alloys. The tool 20 accordingly has higher thermal resistance and abrasion resistance and keeps required hardness at high temperature due to frictional heat during processing. It is thus possible to perform reliable and excellent welding even in a case where the works W1 and W2 are each made of a ferrous alloy or the like, which has a melting point higher than that of an aluminum alloy.

Referring to FIG. 2 again, the control unit 5 can be achieved by a sequencer, a program controller, or the like, and includes an input unit 51, a storage unit 52, an operation unit 53, and a command unit 54. The input unit 51 provides the storage unit 52 with various input information including welding conditions (tool height, tool rotational speed, tool feeding speed, and the like) inputted by a worker or the like. The storage unit 52 is achieved by a storage circuit such as a RAM or a ROM, and stores a computer program used for executing the process steps of friction stir welding, information inputted through the input unit 51, and results of operations by the operation unit 53. The operation unit 53 can be achieved by an operation processing circuit such as a CPU. The operation unit 53 executes the program stored in the storage unit 52 and executes the process steps of friction stir welding in accordance with the welding conditions stored in the storage unit 52 so as to generate control commands for the rotating motor 81, the elevating motor 82, and the transferring motor 83. The operation unit 53 provides the command unit 54 with the control commands thus generated.

The command unit 54 includes a tool rotational speed command unit 55, a tool height command unit (tool height setting means) 56, and a tool feeding speed command unit 57. The tool rotational speed command unit 55 transmits a tool rotational speed command signal to the rotating motor 81 in accordance with the control command from the operation unit 53. The rotating motor 81 is accordingly driven to rotate so that the tool 20 is rotated at the tool rotational speed thus commanded. The tool height command unit 56 transmits a tool height command signal to the elevating motor 82 in accordance with the control command from the operation unit 53. The elevating motor 82 is accordingly driven to rotate so that the tool 20 is set at the tool height thus commanded. The tool 20 made in contact with and pressed against the works W1 and W2 is thus controlled in terms of height, and the tool 20 and the works W1 and W2 have height relationship set in an appropriate range. The tool feeding speed command unit 57 transmits a tool feeding speed command signal to the transferring motor 83 in accordance with the control command from the operation unit 53. The transferring motor 83 is accordingly driven to rotate so that the tool 20 is shifted in the processing direction at the feeding speed thus commanded.

The tool height command unit 56 serves as the tool height setting means for locating the tool 20 at preliminarily set height with respect to the works W1 and W2 so as to control tool height during friction stir welding. More specifically, the elevating motor 82 given a tool height command signal from the tool height command unit 56 is driven to reach predetermined rotational speed. The ball screw 15 then shifts the processing head 7 downward to a predetermined position, and the tool 20 is set at predetermined tool height so as to be in contact with the works W1 and W2 and press the surfaces thereof. The tool height is preliminarily obtained through a test or the like so as to achieve welding between the works W1 and W2 with excellent quality, in accordance with the welding conditions such as the thickness and the material for each of the works W1 and W2, the material, the shape, and the like of the tool 20, the tool rotational speed, and the tool feeding speed. The tool height thus obtained is inputted through the input unit 51 of the control unit 5 so as to be stored in the storage unit 52.

More specifically, as shown in FIG. 5, the tool height of the tool 20 is set at a position where a gap S1 between the distal end of the probe 23 of the tool 20 and the rear surfaces of the works W1 and W2 is within a constant range and a buried amount S2 of the shoulder surface 22 of the tool 20 into the works W1 and W2 is within a constant range. The gap S1 between the distal end of the probe 23 of the tool 20 and the rear surfaces of the works W1 and W2 is preferably set to about 0.1 to 0.2 mm, for example. The buried amount S2 of the shoulder surface 22 of the tool 20 into the works W1 and W2 is preferably set so that the shoulder surface 22 of the tool 20 and the surfaces of the works have a necessary contact area, e.g. the shoulder surface 22 is in contact with the works W1 and W2 by at least 70% of the area of the shoulder surface 22 excluding the probe 23. When the tool 20 and the works W1 and W2 are set to have the height relationship of the tool height mentioned above, the tool 20 is capable of generating frictional heat of an appropriate amount without shortage or overage, thereby inhibiting defects at the welded portion and achieving excellent welding quality.

With reference to FIG. 3, there are located totally two rectangular pneumatic cylinders 6 respectively at left and right ends in the processing direction of the works W1 and W2 below the support table 3. Each of the pneumatic cylinders 6 is provided on the main frame 10 with an L-shaped frame 92 being interposed therebetween. Each of the L-shaped frames 92 is connected to a vertical frame 91 hanging from the support table 3 with a guide member 93, which is slidable upward and downward, being interposed therebetween. The support table 3 is accordingly provided above the L-shaped frames 92 so as to be slidable upward and downward due to the guide members 93. Piping supplying air to the pneumatic cylinders 6 is provided with a pressure control valve (load control means) 61 for constantly keeping secondary pressure. The pressure control valve 61 constantly keeps bias force of the pneumatic cylinders 6. The pneumatic cylinders 6 bias the support table 3 upward with constant bias force, and load control is thus performed so that the tool 20 presses the works W1 and W2 with constant pressurizing force. There can be provided below the support table 3 only one pneumatic cylinder 6 at the center of gravity of the support table 3 or three or more pneumatic cylinders 6 so as to support the support table 3. The pneumatic cylinder 6 can be replaced with a hydraulic cylinder as the cylinder unit.

In the friction stir welding apparatus 1 thus configured in accordance with the present embodiment, the tool 20 of the processing head 7 is rotated and pressed to the joining line L along which the works W1 and W2 are butted against each other on the support table 3 so as to be relatively shifted with respect to the joining line L. The butted portion between the works W1 and W2 are softened and welded by frictional heat thus generated.

When bringing the rotating tool 20 into contact with the works W1 and W2 during friction stir welding, the elevating motor 82 is driven in accordance with a command signal from the tool height command unit 56 and the processing head 7 is shifted downward so that the tool 20 is located at preliminarily set height with respect to the works W1 and W2. The tool 20 is accordingly made in contact with the works W1 and W2 so as to press the works W1 and W2, and tool height is controlled so that the tool 20 and the works W1 and W2 have height relationship within the appropriate range (see FIG. 5).

The support table 3 retaining the works W1 and W2 is biased upward with constant bias force by the pneumatic cylinders 6 in accordance with pressure set by the pressure control valve 61. Bias force (additional bias force) is obtained by subtracting bias force (minimum bias force) equivalent to weight of supporting the support table 3 (including the weight of the support table 3, the weight of the works W1 and W2, and the like) from the bias force of biasing the support table 3 upward. This bias force (additional bias force) acts so that the works W1 and W2 press the tool 20 upward, and serves reactively as pressurizing force of the tool 20 pressing the works W1 and W2. The pneumatic cylinders 6 constantly keep constant upward bias force, and load control is performed so as to constantly keep the pressurizing force of the tool 20 pressing the works W1 and W2.

When the rotating tool 20 travels along the joining line L between the works W1 and W2 in this state so as to perform friction stir welding on the works W1 and W2, it is possible to perform friction stir welding with excellent quality on the works W1 and W2 different in thickness, material, or the like.

In a state where the tool 20 does not press the works W1 and W2 (including a state where the tool 20 is in contact with the works W1 and W2), the pneumatic cylinder 6 supporting the support table 3 receives force of supporting the support table 3, more particularly, the weight of the support table 3 (including the weight of components such as the jig 31 and the backing member 32 attached to the support table 3) and the weight of the works W1 and W2 supported by the support table 3. However, the pneumatic cylinder 6 does not receive the weight of the processing head 7 of the tool 20. In a state where the tool 20 is in contact with the works W1 and W2 so as to press the works W1 and W2, the bias force of the pneumatic cylinder 6 includes, in addition to the bias force (minimum bias force) equivalent to the weight of the support table 3 and the weight of the works W1 and W2, further pressurizing bias force (additional bias force) corresponding to pressurizing force of the tool 20 to the works W1 and W2. In other words, if the bias force of the pneumatic cylinder 6 is kept so as to be equal to the minimum bias force during friction stir welding, the tool 20 has pressurizing force to the works W1 and W2 set to zero, and the additional bias force of further pressurizing the pneumatic cylinder 6 serves as pressurizing force of the tool 20 to the works W1 and W2. It is thus possible to control the pressurizing force of the tool 20 to the works W1 and W2 so as to have zero as the minimum value by setting the bias force (additional bias force) of the pneumatic cylinder 6 to a predetermined value. The pressurizing force of the tool 20 to the works W1 and W2 can be thus set in a wide range from a small value to a large value. For example, it goes without saying that friction stir welding can be certainly performed with pressurizing force of the tool 20 being kept large in a case where the works W1 and W2 are thick, hard, or the like. In a case where the works W1 and W2 are thin, soft, or the like, friction stir welding can be performed with load control so as to keep small pressurizing force of the tool 20. It is possible to set and constantly keep appropriate pressurizing force of the tool 20 to the works W1 and W2 and keep the tool 20 and the works W1 and W2 so as to have height relationship in the appropriate range, in accordance with the thickness, the material, and the like of the works W1 and W2, no matter how the works W1 and W2 are thin, thick, soft, or hard.

In this manner, in the present embodiment, the tool 20 is located at preliminarily set height with respect to the works W1 and W2, and tool height is controlled by means of the tool 20. The pneumatic cylinders 6 each have constantly kept bias force of biasing upward the support table 3 retaining the works W1 and W2, and load control on pressurizing force of the tool 20 to the works W1 and W2 is performed by means of the support table 3. In the state where the tool 20 and the works W1 and W2 are controlled to have height relationship in the appropriate range, load control is performed so that the pneumatic cylinders 6 bias the support table 3 toward the tool 20 with constant bias force. It is thus possible to constantly keep the bias force during friction stir welding.

As described above, according to the present embodiment, it is possible to control so as to constantly keep pressurizing force of the tool 20 to the works W1 and W2 set not only to a relatively large value or but to an extremely small value. The pressurizing force of the tool 20 to the works W1 and W2 can be set appropriately and kept constantly in accordance with the thickness, the material, and the like of the works W1 and W2, so that the tool 20 and the works W1 and W2 can have height relationship kept in the appropriate range. It is accordingly possible to perform friction stir welding with excellent quality even when the works W1 and W2 have different thickness, material, or the like.

The present invention is not limited to the embodiment described above, but can be variously modified within the scope of the present invention. For example, the present invention is applicable not only to friction stir welding (FSW) as in the above embodiment but also to friction stir processing (FSP), friction spot joining (FSJ), and the like.

EXAMPLE

Example

As an example, two tabular works W1 and W2 each made of a ferrous material were butted against each other to perform friction stir welding with use of the friction stir welding apparatus 1 shown in FIGS. 1 to 3.

Figure 4B:
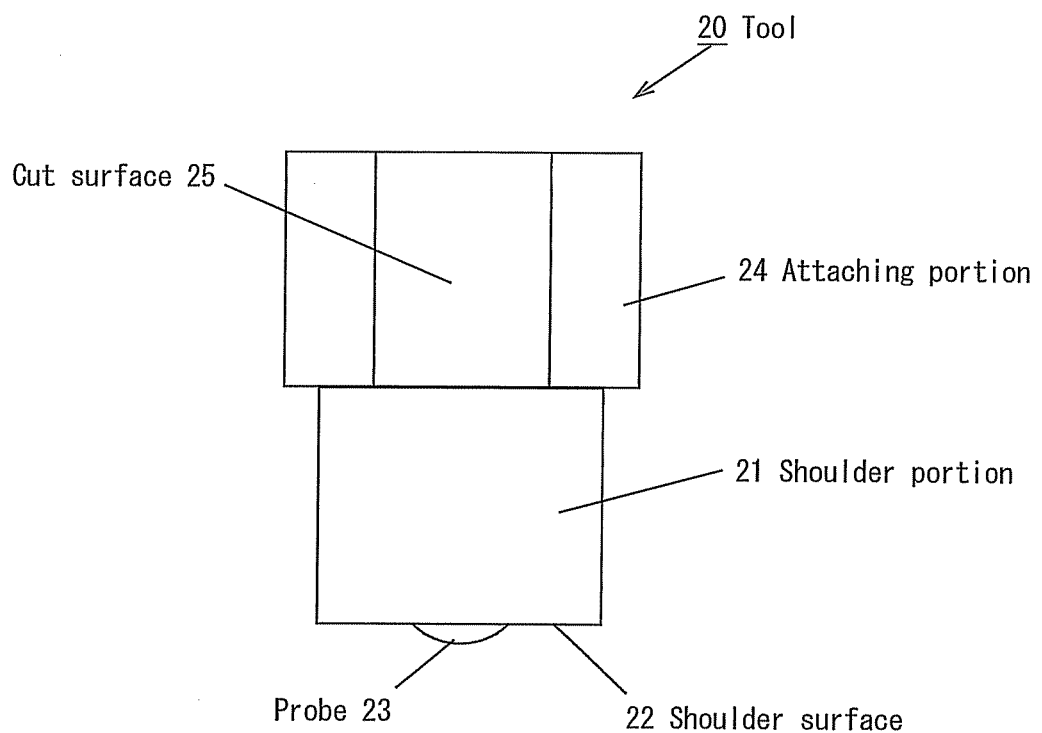

The works W1 and W2 are made of SUS430 and are provided as tabular members having 0.93 mm in thickness and 75 mm×300 mm in size. The tool 20 has the shape shown in FIGS. 4A and 4B, is made of Ni-based dual multi-phase intermetallic compound alloys, and has a shoulder diameter (diameter of the shoulder surface 22) of 12 mm, a probe diameter (diameter of the probe 23) of 4 mm, and a probe length (height of the probe 23 projecting from the shoulder surface 22) of 0.3 mm. The backing member 32 is made of silicon nitride ($Si_3N_4$), and includes three rectangular members of 30×30 mm square and 100 mm long, which are aligned in the joining direction. Friction stir processing was performed with use of the friction stir processing apparatus 1 under the following welding conditions. The lead angle was set to 3 degrees, the tool 20 rotating at the tool rotational speed of 2000 rpm was pressed onto the joining line along which the two works W1 and W2 are butted against each other. After the tool 20 radiated orange light due to frictional heat, the tool 20 was linearly shifted by 250 mm at the welding speed (tool feeding speed) of 900 mm/min. Bias force of the pneumatic cylinder 6 during friction stir welding was constantly kept by the pressure control valve (load control means) 61 so that pressurizing force of the tool 20 to the works W1 and W2 was set to 0.85 ton.

Figure 6:
FIG. 6 is a picture, photographed from a front side, of a welded portion of works obtained by friction stir processing according to an example.

FIG. 6 is a picture of the welded portion between the works W1 and W2 that are butted against each other and welded through friction stir processing according to this example.

Comparative Example

A friction stir welding apparatus according to the comparative example does not include the pneumatic cylinder 6 and the pressure control valve 61, and a support table 31 is fixed at a predetermined position. In other words, the friction stir welding apparatus according to the comparative example simply sets initial tool height, and does not have any mechanism for constantly keeping pressurizing force of the tool 20 to the works W1 and W2. The tool 20 was set at the height so that the end of the shoulder surface 22 was made in contact with the surfaces of the works W1 and W2 and was then shifted downward by 0.2 mm, and friction stir welding was performed. The other conditions are similar to those of the example.

Figure 7:
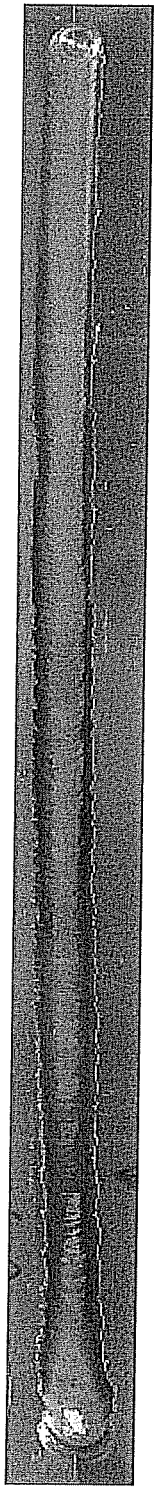
FIG. 7 is a picture, photographed from a front side, of a welded portion of works obtained by friction stir processing according to a comparative example.
Figure 8:
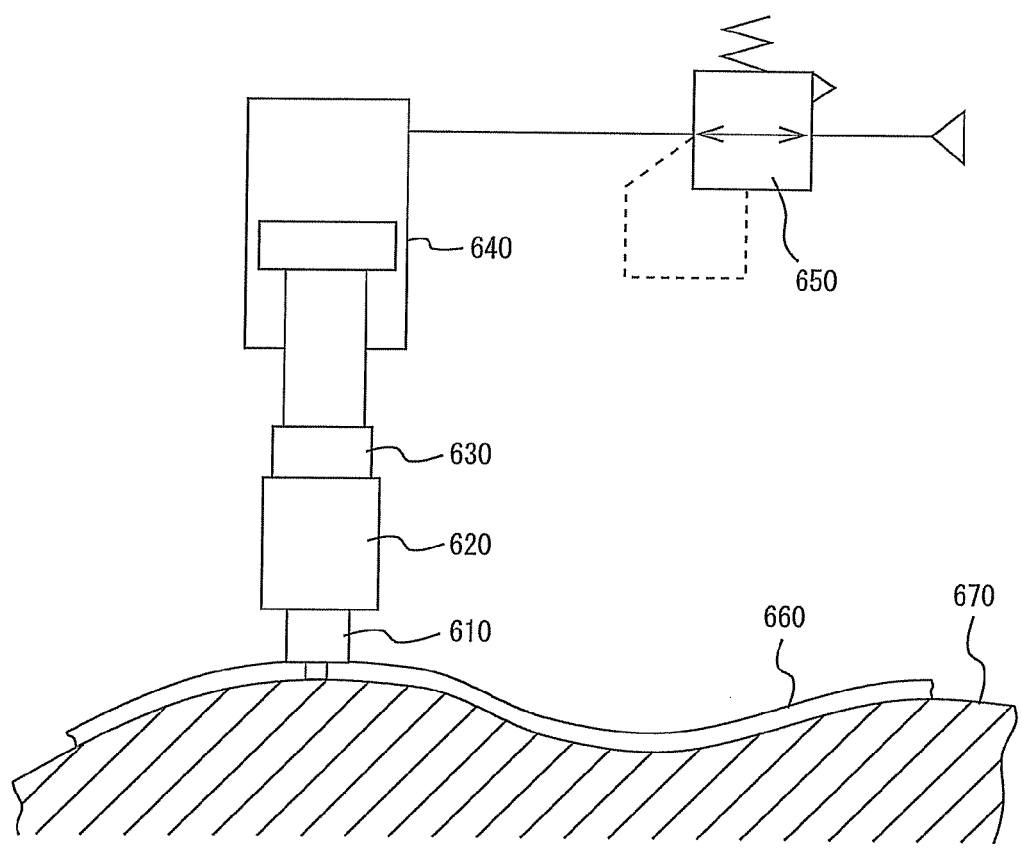
FIG. 8 is a pattern view showing a principal part of a conventional friction stir welding apparatus.

FIG. 7 is a picture of the welded portion between the works W1 and W2 that are butted against each other and welded through friction stir processing according to this comparative example.

(Execution State)

As to the execution state of friction stir processing, excellent welding was not made because the welded portion has execution variation possibly due to insufficient friction stir in the comparative example shown in FIG. 7, whereas welding was made with excellent quality at the welded portion in the example shown in FIG. 6 with no execution variation as in the comparative example.

The example and the comparative example described above proved that friction stir processing can be performed with excellent quality of a fine execution state at the welded portion by appropriately setting pressurizing force of the tool 20 to the works W1 and W2 and constantly keeping the pressurizing force during friction stir processing.

DESCRIPTION OF REFERENCE SIGNS

1: Friction stir welding apparatus (Friction stir processing apparatus)
2: Processing mechanism
3: Support table
6: Pneumatic cylinder (Cylinder unit)
7: Processing head
20: Tool
21: Shoulder portion
22: Shoulder surface
23: Probe
31: Jig
32: Backing member
33: Work presser foot
55: Tool rotational speed command unit
56: Tool height command unit (Tool height setting means)
57: Tool feeding speed command unit
61: Pressure control valve (Load control means)
81: Rotating motor
82: Elevating motor
83: Transferring motor
L: Joining line
W1, W2: Work (Workpiece)

The invention claimed is:

1. A friction stir processing method of pressing a rotating tool against a workpiece made of a metal material and processing the workpiece by softening the workpiece with use of generated frictional heat, the method comprising upon friction stir processing, initially locating the tool at preliminarily set height with respect to the workpiece, then controlling pressure of air supplied to a pneumatic cylinder to constantly keep bias force of the pneumatic cylinder for supporting a support table retaining the workpiece and biasing the support table toward the tool, so as to constantly keep pressurizing force of the tool pressing the workpiece, wherein reactive force of the bias force is caused to serve as the pressurizing force for the tool to press the workpiece on the support table.

* * * * *